US011259196B2

(12) United States Patent
Mahimkar et al.

(10) Patent No.: US 11,259,196 B2
(45) Date of Patent: Feb. 22, 2022

(54) ASSESSING THE IMPACTS OF CELLULAR NETWORK CHANGES

(71) Applicants: AT&T Intellectual Property I, L.P., Atlanta, GA (US); AT&T Mobility II LLC, Atlanta, GA (US)

(72) Inventors: Ajay Mahimkar, Edison, NJ (US); Zihui Ge, Madison, NJ (US); Sanjeev Ahuja, Aurora, IL (US); Nauman Shafi, Frisco, TX (US); Shomik Pathak, Richardson, TX (US)

(73) Assignees: AT&T INTELLECTUAL PROPERTY I, L.P., Atlanta, GA (US); AT&T MOBILITY II LLC, Atlanta, GA (US)

( * ) Notice: Subject to any disclaimer, the term of this patent is extended or adjusted under 35 U.S.C. 154(b) by 58 days.

(21) Appl. No.: 16/790,949

(22) Filed: Feb. 14, 2020

(65) Prior Publication Data
US 2021/0258808 A1 Aug. 19, 2021

(51) Int. Cl.
*H04W 24/08* (2009.01)
*H04W 16/18* (2009.01)

(52) U.S. Cl.
CPC ........... *H04W 24/08* (2013.01); *H04W 16/18* (2013.01)

(58) Field of Classification Search
CPC .............................. H04W 24/08; H04W 16/18
See application file for complete search history.

(56) References Cited

U.S. PATENT DOCUMENTS

| | | | |
|---|---|---|---|
| 2017/0353363 A1* | 12/2017 | Parker | H04L 41/12 |
| 2019/0102545 A1* | 4/2019 | Wang | G06F 21/554 |
| 2020/0092172 A1* | 3/2020 | Kumaran | H04B 17/345 |
| 2021/0075707 A1* | 3/2021 | Kumar | H04L 43/067 |

OTHER PUBLICATIONS

Ajay Mahimkar, Zihui Ge, Sanjeev Ahuja, Shomik Pathak, Nauman Shafi, "Rigorous, Effortless and Timely Assessment of Cellular Network Changes", Published Jun. 2019. DOI 10.1109/DSN.2019.00037. Conference 2019 49th Annual IEEE/IFIP International Conference on Dependable Systems and Networks (DSN) (Year: 2019).*
"Rigorous, Effortless and Timely Assessment of Cellular Network Changes", Ajay Mahimkar et al. Published Jun. 2019. DOI: 10.1109/DSN.2019.00037. Conference: 2019 49th Annual IEEE/IFIP International Conference on Dependable Systems and Networks (DSN) https://www.researchgate.net/publication/335364078_Rigorous_Effortless_and_Timely_Assessment_of_Cellular_Network_Changes.

* cited by examiner

*Primary Examiner* — Wesley L Kim
*Assistant Examiner* — Hung K Du

(57) ABSTRACT

A method includes selecting a study group including a first network element and a second network element of a network, selecting a control group including a third network element, identifying times at which a change is deployed at the first network element and the second network element, time-aligning the change at the first element and the change at the second network element to a common time, performing a statistical analysis that compares the performance of the network before the common time to the performance of the network after the common time, detecting an impact of the change on a performance of the network based on the statistical analysis, and initiating a remedial action when the impact comprises a degradation to the performance.

20 Claims, 4 Drawing Sheets

ASSESSING THE IMPACTS OF CELLULAR NETWORK CHANGES

The present disclosure relates generally to cellular network architecture, and relates more particularly to devices, non-transitory computer-readable media, and methods for assessing the impacts of changes to a cellular network architecture.

BACKGROUND

Cellular service providers are continuously upgrading their network technologies and infrastructures in order to ensure that the quality of the customer experience is not adversely impacted by increasing network traffic and application usage (e.g., by connected cars, Internet of Things devices, and the like). For instance, service providers may deploy changes in the form of new software releases, new service features, configuration parameter changes, equipment re-homes, hardware and/or firmware upgrades, security patches, topology modifications, and the like.

SUMMARY

Examples of the present disclosure include a method, apparatus, and non-transitory computer-readable storage medium for assessing the impacts of changes to a cellular network architecture. In one example, a method performed by a processing system in a telecommunication service provider network includes selecting a study group, wherein the study group comprises at least a first network element and a second network element of the telecommunication service provider network, selecting a control group, wherein the control group comprises a third network element of the telecommunication service provider network, identifying a time at which a change is deployed at the first network element, identifying at time at which the change is deployed at the second network element, wherein the time at which the change is deployed at the second network element is subsequent to the time at which the change is deployed at the first network element, time-aligning the change at the first element and the change at the second network element to a common time, computing a first time-series based on a first set of values for key performance indicators of the study group, wherein the first set of values is measured prior to the common time, computing a second time-series based on a second set of values for the key performance indicators of the study group, wherein the second set of values is measured subsequent to the common time, computing a third time-series based on a third set of values for key performance indicators of the control group, wherein the third set of values is measured prior to the common time, computing a fourth time-series based on a fourth set of values for the key performance indicators of the control group, wherein the fourth set of values is measured subsequent to the common time, detecting an impact of the change on a performance of the telecommunication service provider network by comparing the first time-series, the second time-series, the third-time series, and the fourth time-series, and initiating a remedial action when the impact comprises a degradation to the performance.

In another example, a device includes a processing system of a telecommunication service provider network and a computer-readable medium storing instructions which, when executed by the processing system, cause the processing system to perform operations. The operations include selecting a study group, wherein the study group comprises at least a first network element and a second network element of the telecommunication service provider network, selecting a control group, wherein the control group comprises a third network element of the telecommunication service provider network, identifying a time at which a change is deployed at the first network element, identifying at time at which the change is deployed at the second network element, wherein the time at which the change is deployed at the second network element is subsequent to the time at which the change is deployed at the first network element, time-aligning the change at the first element and the change at the second network element to a common time, computing a first time-series based on a first set of values for key performance indicators of the study group, wherein the first set of values is measured prior to the common time, computing a second time-series based on a second set of values for the key performance indicators of the study group, wherein the second set of values is measured subsequent to the common time, computing a third time-series based on a third set of values for key performance indicators of the control group, wherein the third set of values is measured prior to the common time, computing a fourth time-series based on a fourth set of values for the key performance indicators of the control group, wherein the fourth set of values is measured subsequent to the common time, detecting an impact of the change on a performance of the telecommunication service provider network by comparing the first time-series, the second time-series, the third-time series, and the fourth time-series, and initiating a remedial action when the impact comprises a degradation to the performance.

In another example, a computer-readable medium stores instructions which, when executed by a processing system of a telecommunications service provider network, cause the processing system to perform operations. The operations include selecting a study group, wherein the study group comprises at least a first network element and a second network element of the telecommunication service provider network, selecting a control group, wherein the control group comprises a third network element of the telecommunication service provider network, identifying a time at which a change is deployed at the first network element, identifying at time at which the change is deployed at the second network element, wherein the time at which the change is deployed at the second network element is subsequent to the time at which the change is deployed at the first network element, time-aligning the change at the first element and the change at the second network element to a common time, computing a first time-series based on a first set of values for key performance indicators of the study group, wherein the first set of values is measured prior to the common time, computing a second time-series based on a second set of values for the key performance indicators of the study group, wherein the second set of values is measured subsequent to the common time, computing a third time-series based on a third set of values for key performance indicators of the control group, wherein the third set of values is measured prior to the common time, computing a fourth time-series based on a fourth set of values for the key performance indicators of the control group, wherein the fourth set of values is measured subsequent to the common time, detecting an impact of the change on a performance of the telecommunication service provider network by comparing the first time-series, the second time-series, the third-time series, and the fourth time-series, and initiating a remedial action when the impact comprises a degradation to the performance.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
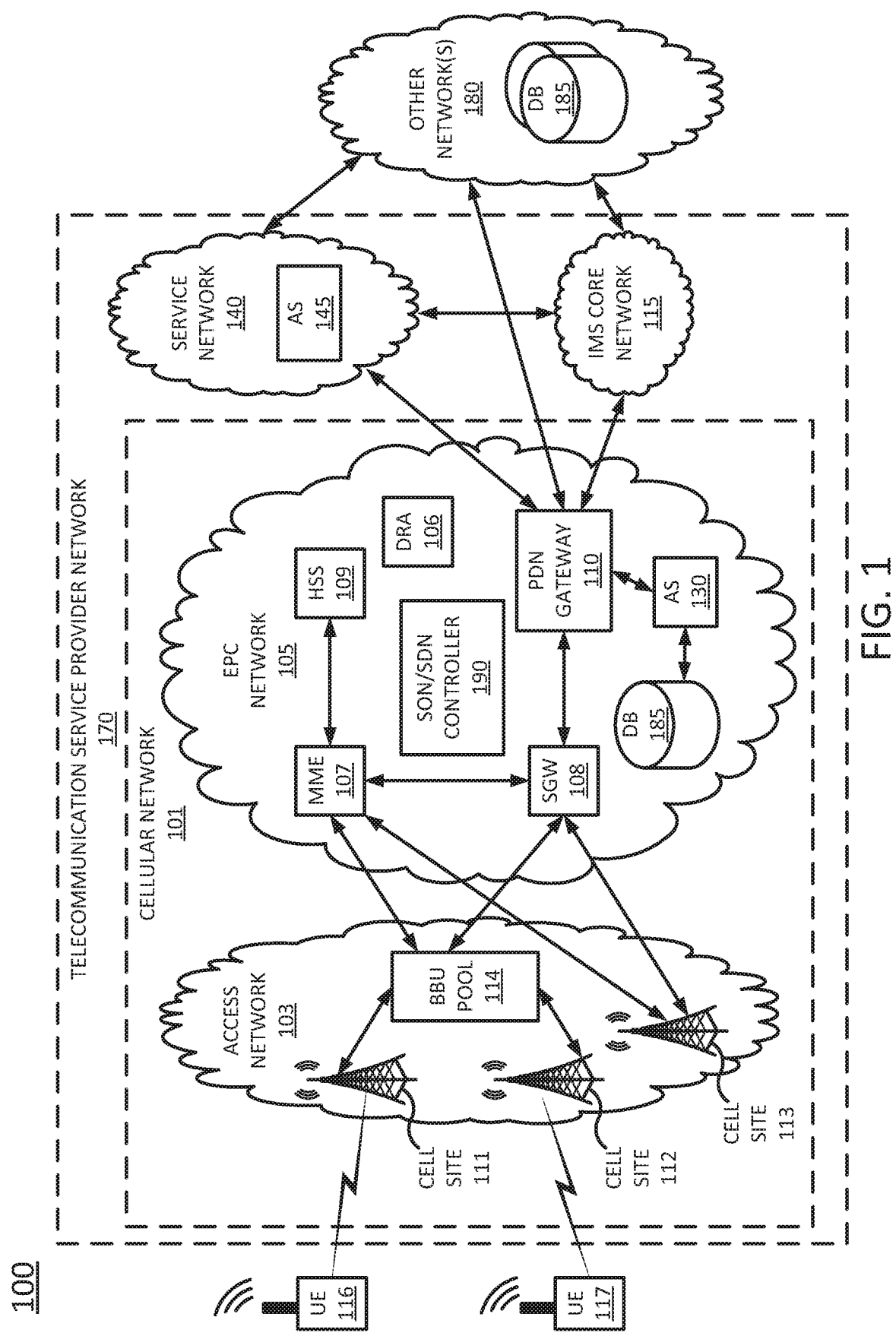
FIG. 1 illustrates an example network, or system, in which examples of the present disclosure for assessing the impacts of changes to a cellular network architecture may operate.

In one example, the present disclosure describes a device, computer-readable medium, and method for assessing the impacts of changes to a cellular network architecture. As discussed above, cellular service providers are continuously upgrading their network technologies and infrastructures in order to ensure that the quality of the customer experience is not adversely impacted by increasing network traffic and application usage. For instance, service providers may deploy changes in the form of new software releases, new service features (e.g., circuit-switched fallback to voice over long term evolution, Internet of Things, premium quality of service for emergency/first responders, long term evolution to fifth generation, carrier aggregation, small cells for capacity enhancements or interference coordination, etc.), configuration parameter changes, equipment re-homes, hardware and/or firmware upgrades, security patches, vendor migrations, topology modifications, and the like.

When considering a proposed change for deployment in the network, it is common practice to first evaluate the proposed change in a controlled laboratory environment. The laboratory environment may include, for example, vendor equipment running the most up to date software. The vendor equipment may also be configured using configuration settings that are selected to mimic the settings in the field.

If the impact of the proposed change on network performance is as expected in the laboratory environment, then the proposed change may be tested on a small scale in the field, as a first field application (FFA). The sampling rate for FFA testing may vary from approximately 0.5 to one percent of the entire network. The duration of FFA testing may vary from several weeks to several months, and may involve turning on and turning off different functionalities in order to validate the impacts observed in the field. FFA testing comes closer than laboratory testing to replicating the scale, complexity, configuration, and diversity of a large operational network; however, replication of user behaviors and traffic patterns may still present a challenge at this stage. The goal of FFA testing thus may be to minimize risk while validating the expected impacts of the proposed change on network performance.

If FFA testing is successful (e.g., the expected impacts of the proposed change on network performance are validated), then the proposed change may be deployed in a network-wide rollout. Because the impacts of the network-wide rollout may differ from the impacts of the FFA testing (due to differences in configurations, traffic patterns, user mobility, network topology, radio frequency propagation, and/or landscapes), the impacts of the proposed change on network performance may still be monitored closely after the network-wide rollout. If any unintended or unexpected impacts on network performance are observed after the network-wide rollout, the proposed change may be halted or rolled back, e.g., to allow for further testing and/or development.

Thus, collectively the various phases of testing and rollout evaluate the impact of a proposed change on network performance by comparing the network performance before deployment of the proposed change and after deployment of the proposed change. Although this process is generally reliable, it is not without its challenges.

For instance, network service performance may depend heavily on traffic variations observed across different times of day (e.g., peak versus off-peak hours, weekdays versus weekends, etc.). This makes identification of the baseline performance (e.g., performance in the absence of the proposed change) non-trivial.

Furthermore, external factors such as weather changes (e.g., heavy rainfall), foliage changes (e.g., leaves falling), and network events (e.g., failures, congestion) may negatively impact network service performance. These external factors may also make it more difficult to compare performance before and after deployment of the proposed change.

In addition, most changes are rolled out across a network in a staggered manner (e.g., over multiple days), for two main reasons: (1) the concurrent deployment of changes is governed by the execution limits on the element management systems (EMSs), so it may not be feasible to change the entire network in a single instant; and (2) staggered rollout allows the impacts of the change of network performance to be monitored more carefully, allowing any degradation in network performance to be limited to a smaller segment of the network. However, a staggered rollout also makes it more challenging to accurately quantify the impacts of the change on network performance.

Moreover, one may need to consider somewhere on the order of hundreds of thousands of network performance metrics of interest in order to properly assess the impacts of a change on network performance, and manually analyzing multiple network performance metrics can be a time consuming and tedious task.

Additionally, the large number of network elements (e.g., base stations, switches, routers, gateways, and the like), the diverse configurations of these network elements, and the complex interactions of these network elements across layers of the network make it challenging to assess the impacts of changes on network performance. For example, the impact of a software upgrade on base stations may be assessed, where the base stations may include different hardware versions and/or different carrier frequencies, or may even support phones having different models and operating system versions to ensure that the impact is similar across all permutations. Any unintended or unwanted impacts on network performance may need to be detected quickly in this case in order to ensure that appropriate action can be taken in a timely manner.

Finally, as changes are introduced into the network, the assessment capabilities may need to be adapted either in the form of modifications to network performance metrics of interest or modifications to how the control group elements are selected. For example, a dropped calls metric may be modified when a cellular network evolves from circuit-switched fallback (CSFB) for long-term evolution (LTE) users for voice connections to Voice over LTE (VoLTE) (e.g., packet-switches Internet Protocol multimedia subsystem (IMS) core).

Examples of the present disclosure take as inputs a list of network elements and a list of key performance indicators (KPI) to assess network performance before and after deployment of a change to the network. For instance, by comparing network performance metrics before and after deployment of the change, the metrics which exhibit the most significant statistical changes in behavior can be identified in a timely manner.

In one example, a robust approach is employed in order to capture time-series variations in traffic and service performance, in order to minimize the influence of traffic variations by time on the assessment. Additionally, a relative performance comparison between a study group (e.g., network elements at which the change has been deployed) versus a control group (e.g., network elements at which the change has not been deployed) helps to minimize the influence of external factors on the assessment and to increase the confidence that any observed impacts on network performance are a result of the change.

In further examples, the rollout of the change may be time-aligned across multiple network elements, and network performance data after normalization may be aggregated, in order to allow for more accurate quantification of the impacts of the change on network performance.

The disclosed approach enables scalable and automated assessment of impacts on network performance across various combinations of network element configurations and highlights the combinations with impacts that are unintended or unwanted, allowing for timely action to be taken. Moreover, the software developed for implementing the disclosed approach may be designed in a modular manner that allows the capabilities of the assessment to easily adapt to the changes that are deployed in the network.

It should also be noted that although examples of the present disclosure are described primarily in connection with cellular networks, the present disclosure is also applicable to other types of networks and network infrastructure, including wired or wireless networks (e.g., home broadband), and so forth. These and other aspects of the present disclosure are described in greater detail below in connection with the examples of FIGS. 1-4.

To better understand the present disclosure, FIG. 1 illustrates an example network, or system 100, in which examples of the present disclosure for assessing the impacts of changes to a cellular network architecture may operate. In one example, the system 100 includes a telecommunication service provider network 170. The telecommunication service provider network 170 may comprise a cellular network 101 (e.g., a 4G/Long Term Evolution (LTE) network, a 4G/5G hybrid network, or the like), a service network 140, and a core network, e.g., an IP Multimedia Subsystem (IMS) core network 115. The system 100 may further include other networks 180 connected to the telecommunication service provider network 105. FIG. 1 also illustrates various endpoint devices 116 and 117, e.g., user equipment or user endpoints (UE). UEs 116 and 117 may each comprise mobile endpoint devices such as a cellular telephone, a smartphone, a tablet computing device, a laptop computer, a pair of computing glasses, a wireless enabled wristwatch, a connected car, or any other cellular-capable mobile telephony and computing devices (broadly, "mobile endpoint devices"). Non-mobile wireless enabled endpoint devices, such as desktop computers, smart televisions, set top boxes, gaming consoles, intelligent personal assistants, or connected home devices (e.g., Wi-Fi enabled thermostats, lighting systems, security systems, or the like), may also be connected to the telecommunication service provider network 170. The UEs 116 and 117 may be associated with a subscription service provided over the telecommunication service provider network 170, such as cellular phones services or other services.

In one example, the cellular network 101 may comprise an access network 103 and a core network, Evolved Packet Core (EPC) network 105. In one example, the access network 103 comprises a cloud RAN. For instance, a cloud RAN is part of the 3$^{rd}$ Generation Partnership Project (3GPP) 5G specifications for mobile networks. As part of the migration of cellular networks towards 5G, a cloud RAN may be coupled to an EPC network until new cellular core networks are deployed in accordance with 5G specifications. In one example, access network 103 may include cell sites 111 and 112 and a baseband unit (BBU) pool 114. In a cloud RAN, radio frequency (RF) components, referred to as remote radio heads (RRHs), may be deployed remotely from baseband units, e.g., atop cell site masts, buildings, and so forth. In one example, the BBU pool 114 may be located at distances as far as 20-80 kilometers or more away from the antennas/remote radio heads of cell sites 111 and 112 that are serviced by the BBU pool 114. It should also be noted in accordance with efforts to migrate to 5G networks, cell sites may be deployed with new antenna and radio infrastructures such as multiple input multiple output (MIMO) antennas, and millimeter wave antennas. In this regard, a cell, e.g., the footprint or coverage area of a cell site, may, in some instances be smaller than the coverage provided by NodeBs or eNodeBs of 3G-4G RAN infrastructure. For example, the coverage of a cell site utilizing one or more millimeter wave antennas may be 1000 feet or less.

Although cloud RAN infrastructure may include distributed RRHs and centralized baseband units, a heterogeneous network may include cell sites where RRH and BBU components remain co-located at the cell site. For instance, cell site 113 may include RRH and BBU components. Thus, cell site 113 may comprise a self-contained "base station." With regard to cell sites 111 and 112, the "base stations" may comprise RRHs at cell sites 111 and 112 coupled with respective baseband units of BBU pool 114.

In one example, the EPC network 105 provides various functions that support wireless services in the LTE environment. In one example, EPC network 105 is an Internet Protocol (IP) packet core network that supports both real-time and non-real-time service delivery across a LTE network, e.g., as specified by the 3GPP standards. In one example, all cell sites in the access network 103 are in communication with the EPC network 105 via baseband units in BBU pool 114. In operation, mobile endpoint device UE 116 may access wireless services via the cell site 111 and mobile endpoint device UE 117 may access wireless services via the cell site 112 located in the access network 103. It should be noted that any number of cell sites can be deployed in access network. In one illustrative example, the access network 103 may comprise one or more cell sites.

In EPC network 105, network devices such as Mobility Management Entity (MME) 107 and Serving Gateway (SGW) 108 support various functions as part of the cellular network 101. For example, MME 107 is the control node for the LTE access network. In one embodiment, MME 107 is responsible for UE (User Equipment) tracking and paging (e.g., such as retransmissions), bearer activation and deactivation process, selection of the SGW, and authentication of a user. In one embodiment, SGW 108 routes and forwards user data packets, while also acting as the mobility anchor for the user plane during inter-cell handovers and as the anchor for mobility between LTE and other wireless technologies, such as 2G and 3G wireless networks.

In addition, EPC network 105 may comprise a Home Subscriber Server (HSS) 109 that contains subscription-related information (e.g., subscriber profiles), performs authentication and authorization of a wireless service user, and provides information about the subscriber's location. The EPC network 105 may also comprise a packet data network (PDN) gateway 110 which serves as a gateway that provides access between the EPC network 105 and various data networks, e.g., service network 140, IMS core network 115, other network(s) 180, and the like. The packet data network gateway is also referred to as a PDN gateway, a PDN GW or a PGW. In addition, the EPC network 105 may include a Diameter routing agent (DRA) 106, which may be engaged in the proper routing of messages between other elements within EPC network 105, and with other components of the system 100, such as a call session control function (CSCF) (not shown) in IMS core network 115. For clarity, the connections between DRA 106 and other components of EPC network 105 are omitted from the illustration of FIG. 1.

In one example, service network 140 may comprise one or more devices, such as application server (AS) 145 for providing services to subscribers, customers, and or users. For example, telecommunication service provider network 170 may provide a cloud storage service, web server hosting, social media applications, and other services. As such, service network 140 may represent aspects of telecommunication service provider network 170 where infrastructure for supporting such services may be deployed. Although a single application server, AS 145, is illustrated in service network 140, it should be understood that service network 140 may include any number of components to support one or more services that may be provided to one or more subscribers, customers, or users by the telecommunication service provider network 170.

In one example, other networks 180 may represent one or more enterprise networks, a circuit switched network (e.g., a public switched telephone network (PSTN)), a cable network, a digital subscriber line (DSL) network, a metropolitan area network (MAN), an Internet service provider (ISP) network, and the like. In one example, the other networks 180 may include different types of networks. In another example, the other networks 180 may be the same type of network. In one example, the other networks 180 may represent the Internet in general.

In accordance with the present disclosure, any one or more of the components of EPC network 105 may comprise network function virtualization infrastructure (NFVI), e.g., SDN host devices (i.e., physical devices) configured to operate as various virtual network functions (VNFs), such as a virtual MME (vMME), a virtual HHS (vHSS), a virtual serving gateway (vSGW), a virtual packet data network gateway (vPGW), and so forth. For instance, MME 107 may comprise a vMME, SGW 108 may comprise a vSGW, and so forth. In this regard, the EPC network 105 may be expanded (or contracted) to include more or less components than the state of EPC network 105 that is illustrated in FIG. 1. In this regard, the EPC network 105 may also include a self-optimizing network (SON)/software defined network (SDN) controller 190. In one example, SON/SDN controller 190 may function as a self-optimizing network (SON) orchestrator that is responsible for activating and deactivating, allocating and deallocating, and otherwise managing a variety of network components. For instance, SON/SDN controller 190 may activate and deactivate antennas/remote radio heads of cell sites 111 and 112, respectively, may allocate and deactivate baseband units in BBU pool 114, and may perform other operations for activating antennas based upon a location and a movement of a group of mobile endpoint devices, in accordance with the present disclosure.

In one example, SON/SDN controller 190 may further comprise a SDN controller that is responsible for instantiating, configuring, managing, and releasing VNFs. For example, in a SDN architecture, a SDN controller may instantiate VNFs on shared hardware, e.g., NFVI/host devices/SDN nodes, which may be physically located in various places. In one example, the configuring, releasing, and reconfiguring of SDN nodes is controlled by the SDN controller, which may store configuration codes, e.g., computer/processor-executable programs, instructions, or the like for various functions which can be loaded onto an SDN node. In another example, the SDN controller may instruct, or request an SDN node to retrieve appropriate configuration codes from a network-based repository, e.g., a storage device, to relieve the SDN controller from having to store and transfer configuration codes for various functions to the SDN nodes.

In accordance with the present disclosure, SON/SDN controller 190 may therefore control various components within EPC network 105 and/or within access network 103 to support the traffic that is accommodated by the activation of antennas/remote radio heads of cell sites 111 and 112, respectively and the allocation of baseband units in BBU pool 114. For instance, SON/SDN controller 190 (e.g., performing functions of a SON orchestrator) may activate an antenna of cell site 111 and assign a baseband unit in BBU pool 114 when a group of mobile endpoint devices is detected near the cell site 111. SON/SDN controller 190 (e.g., performing functions of a SDN controller) may further instantiate VNFs to function as routers, switches, gateways, and the like to ensure that sufficient backhaul resources are available for the traffic to transit the access network 103 and/or EPC network 105. In addition, as mentioned above, any one or more of the DRA 106, MME 107, SGW 108, HSS 109, and PGW 110 may comprise VNFs instantiated on host devices. As such, SON/SDN controller 190 may perform similar operations to instantiate, configure, reconfigure, and decommission such components in support of examples of the present disclosure for activating antennas based upon a location and a movement of a group of mobile endpoint devices.

In one example, SON/SDN controller 190 may comprise all or a portion of a computing device or system, and may be configured to provide one or more functions to support examples of the present disclosure for assessing the impacts of changes to the telecommunication service provider network 170, and for performing various other operations in accordance with the present disclosure. For example, SON/SDN controller 190 may work in conjunction with a cell site 111-113 and/or baseband unit of BBU pool 114 to track changes that are deployed in the telecommunication service provider network 170 and/or to track the impacts of such changes on network performance, in connection with operations of the method of FIG. 2. For instance, SON/SDN controller 190 may store periodic reports transmitted by sample user endpoint devices relating to real-time network performance (e.g., signal quality/strength, upload speed, download speed, bandwidth, connection speed, and the like observed by the sample user endpoint devices), and these reports may be taken into account when assessing the impacts of changes to the telecommunication service provider network 170.

Accordingly, the SON/SDN controller 190 may be connected directly or indirectly to any one or more network elements of EPC network 105, and of the system 100 in general. Due to the relatively large number of connections available between SON/SDN controller 190 and other network elements, none of the actual links to the application server are shown in FIG. 1. Similarly, intermediate devices and links between DRA 106, MME 107, SGW 108, eNodeBs 111 and 112, PDN gateway 110, and other components of system 100 are also omitted for clarity, such as additional routers, switches, gateways, and the like.

As further illustrated in FIG. 1, EPC network 105 may further include an application server (AS) 130, which may comprise all or a portion of a computing device or system, such as computing system 400, and/or processing system 402 as described in connection with FIG. 4 below, and may be configured to perform various operations in connection with assessing the impacts of changes to the telecommunication service provider network 170, and for performing various other operations in accordance with the present disclosure. For instance, AS 130 may host one or more applications that are configured to aggregate data from various sources in order to, for example, detect when changes in the telecommunication service provider network 170 result in a decrease in network performance. In this regard, AS 130 may maintain communications with BBU pool 114, cell sites 111-113, and so forth, via PDN gateway 110 and SGW 108, for example.

One of these sources may comprise a database (DB) 185 in the EPC network 105, which may store data sets from EMSs that cover different network elements over different regions of the telecommunication service provider network 170. The data sets may include, for the respective network elements, network performance measurements, configuration logs, topological information, call detail records, network alarms, and/or other data. The data sets may be captured and stored in the DB 185 for offline queries and analytics. In addition, the DB 185 may store change requests and network trouble tickets for management by an operations team.

In one example, network and service performance measurements may be captured at regular intervals (e.g., every x minutes) across the telecommunication service provider network 170 and stored in the DB 185. On the RAN side, the measurements may be captured on the sector level. In one example, the network performance measurements may capture metrics including physical radio resource block utilization (PRB) for the downlink and uplink channels, signal-to-interference-and-noise ratio (SINR), channel quality indicators, MIMO utilization, carrier aggregation penetration, effectiveness, compatibility, and/or other metrics.

The service performance measurements may capture metrics for both voice and data services and may cover accessibility, retainability, throughput, handovers, traffic, time spent on LTE versus UMTS, and/or other metrics. In this context, accessibility may refer to a rate of successful call attempts by the users of the telecommunication service provider network 170. Retainability may refer to the rate of successful call termination by the users (where dropped calls by the network due to failed handovers, congestion, or channel quality result in lower retainability). Data throughput may refer to the byte volumes delivered to the users over the telecommunication service provider network 170. Handover success rates may be measured for each pair of calls. For instance, if a mobile user is successfully handed off from sector A to sector B, then the handover may be recorded as a successful outgoing handover for sector A and a successful incoming handover for sector B. Traffic measurements may be recorded for voice using the number of calls, the time spent in minutes, and for data sessions on the uplink and downlink channel. It is generally desirable to have high values for accessibility, retainability, data throughput, handover successes, and traffic volumes.

Key performance indicators (KPIs) can be derived using a set of counters, and the counter descriptions can vary across vendors and/or technologies. Table 1, below, illustrates some sample KPI equations. For instance, for deriving VoLTE retainability, one may account for quality of service class identifier (QCI-1) normal and abnormal releases at both eNodeB as well as MME.

TABLE 1

Example KPI Equations

Data Radio Bearer Establishment Success % =

$$\frac{100 * \Sigma_{i=6}^{9}(PmErabEstabSuccInitQci_i + PmErabEstabSuccAddedQci_i)}{\Sigma_{i=6}^{9}(PmErabEstabAttInitQci_i + PmErabEstabAttAddedQci_i)}$$

VOLTE Retainability=

$$\frac{PmErabRelNormalEnbQci_1 + PmErabRelMmeQci_1 - PmErabRelAbnormalMMeQci_1}{PmErabRelNormalEnbQci_1 + PmErabRelAbnormalEnbQci_1 - pmErabRelMMeQci_1}$$

In a further example, the DB 185 may also store configuration snapshots for each network element, which may be collected on a regularly basis (e.g., once per day) from the EMSs. The configuration snapshots may capture information such as software version, hardware version, carrier frequency, channel bandwidth, manufacturer, and/or other information for the corresponding network elements. Information such as morphology (e.g., whether the network element serves an urban, suburban, or rural area) can be derived from the configuration snapshot. Protocol-level configuration data in the configuration snapshot may capture information such as whether carrier aggregation is enabled or disabled, failure recovery timers, whether sleep mode is enabled or disabled, and/or other information. Topological configuration data in the configuration snapshot may capture information about neighbors (e.g., X2 links in an LTE network capture the logical neighbor for a sector), upstream and downstream nodes (e.g., an eNodeB is upstream for its sectors and is downstream for MME).

In another example, the DB 185 may store information about network alarms and trouble tickets. Network alarms may capture information such as link failures, loss of communication, resource configuration failures, hardware faults, software errors, channel quality, service performance anomalies, and/or other occurrences. The network alarms may be recorded by the EMSs in real time and may capture the exact times of the occurrences, the locations of the occurrences, the severities of the alarms (e.g., critical, major, minor, warning, etc.), and/or other information. Actionable alarms may be reported in the form of trouble tickets to a different database. An operations team of the telecommunication service provider may start from trouble tickets, conduct an investigation and root cause analysis, and take remedial actions to resolve any issues. The DB 185 may interface with the trouble ticketing database to update the ticket status once the remedial actions are taken. It is expected that, after the remedial action is taken, the network and service performance should restore to the time before the creation of the ticket.

The foregoing description of the system 100 is provided as an illustrative example only. In other words, the example of system 100 is merely illustrative of one network configuration that is suitable for implementing embodiments of the present disclosure. As such, other logical and/or physical arrangements for the system 100 may be implemented in accordance with the present disclosure. For example, the system 100 may be expanded to include additional networks, such as network operations center (NOC) networks, additional access networks, and so forth. The system 100 may also be expanded to include additional network elements such as border elements, routers, switches, policy servers, security devices, gateways, a content distribution network (CDN), EMSs, and the like, without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For instance, in one example, SON/SDN controller 190 may be spilt into separate components to operate as a SON orchestrator and a SDN controller, respectively. Similarly, although the SON/SDN controller 190 is illustrated as a component of EPC network 105, in another example SON/SDN controller 190, and/or other network components may be deployed in an IMS core network 115 instead of being deployed within the EPC network 105, or in other portions of system 100 that are not shown, while providing essentially the same functionality. Similarly, functions described herein with respect to AS 130 may alternatively or additionally be provided by AS 145.

In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 4 and discussed below) or multiple computing devices collectively configured to perform various steps, functions, and/or operations in accordance with the present disclosure.

In addition, although aspects of the present disclosure have been discussed above in the context of a long term evolution (LTE)-based wireless network, examples of the present disclosure are not so limited. Thus, the teachings of the present disclosure can be applied to other types of wireless networks (e.g., a 2G network, a 3G network, a 5G network, an integrated network, e.g., including any two or more of 2G-5G infrastructure and technologies, and the like), that are suitable for use in connection with examples of the present disclosure for forecasting network traffic for events. For example, as illustrated in FIG. 1, the cellular network 101 may represent a "non-stand alone" (NSA) mode architecture where 5G radio access network components, such as a "new radio" (NR), "gNodeB" (or "gNB"), and so forth are supported by a 4G/LTE core network (e.g., a Evolved Packet Core (EPC) network 105). However, in another example, system 100 may instead comprise a 5G "standalone" (SA) mode point-to-point or service-based architecture where components and functions of EPC network 105 are replaced by a 5G core network, which may include an access and mobility management function (AMF), a user plane function (UPF), a session management function (SMF), a policy control function (PCF), a unified data management function (UDM), an authentication server function (AUSF), an application function (AF), a network repository function (NRF), and so on. For instance, in such a network, application server (AS) 130 of FIG. 1 may represent an application function (AF) for assessing the impacts of changes to the telecommunication service provider network 170 in accordance with various examples of the present disclosure. In addition, any one or more of cell sites 111-113 may comprise 2G, 3G, 4G and/or LTE radios, e.g., in addition to 5G new radio (NR) functionality. For instance, in non-standalone (NSA) mode architecture, LTE radio equipment may continue to be used for cell signaling and management communications, while user data may rely upon a 5G new radio (NR), including millimeter wave communications, for example. Thus, these and other modifications are all contemplated within the scope of the present disclosure.

Figure 2:
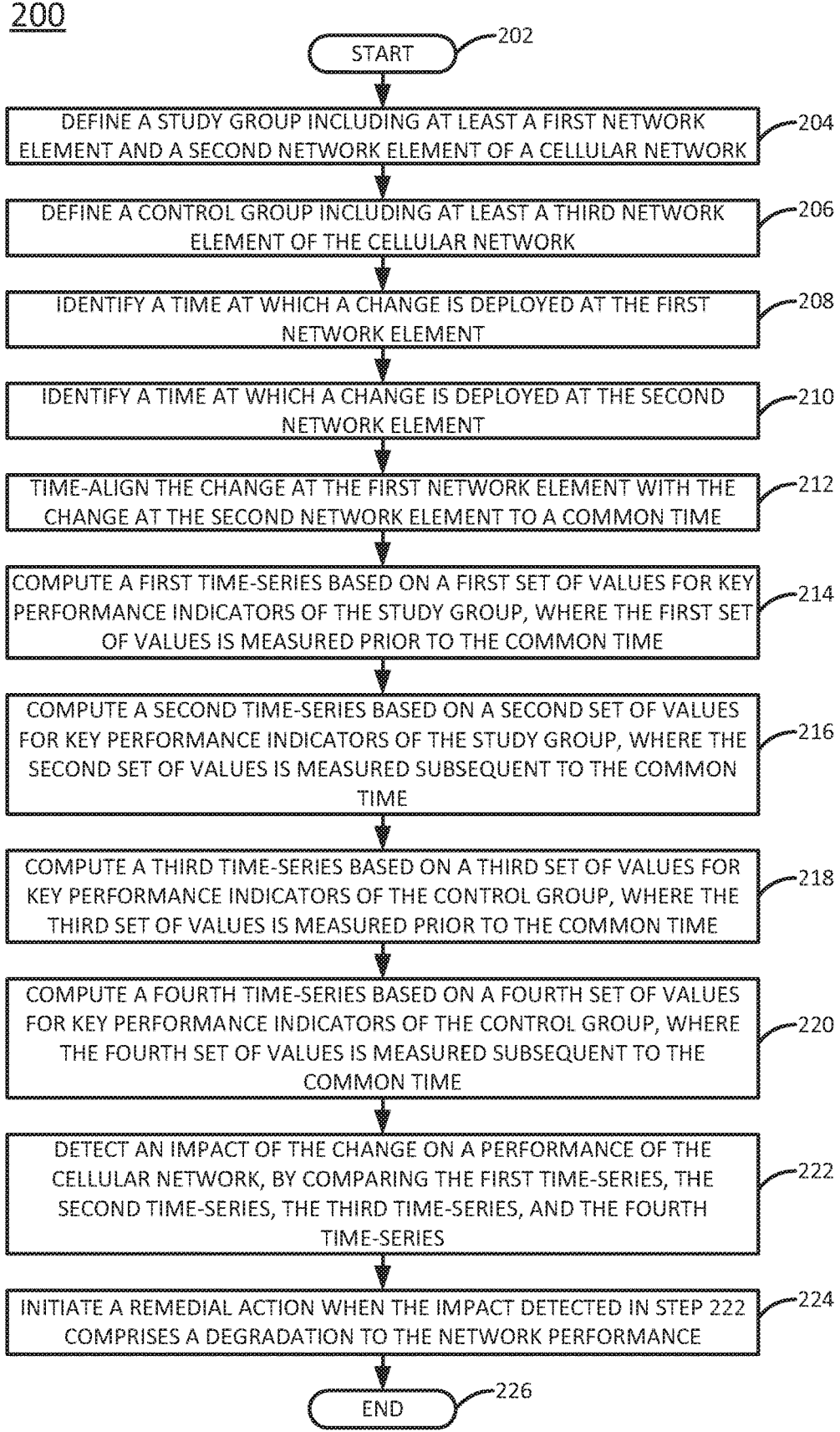
FIG. 2 illustrates a flowchart of an example method for assessing the impacts of changes to a cellular network architecture, such as the telecommunication service provider network of FIG. 1.

FIG. 2 illustrates a flowchart of an example method 200 for assessing the impacts of changes to a cellular network architecture, such as the telecommunication service provider network 170 of FIG. 1. In one example, the method 200 is performed by a server or network element, e.g., application server 130 of FIG. 1, or any one or more components thereof, such as a processing system, or by one of these devices in conjunction with other devices and/or components of network 100 of FIG. 1. In one example, the steps, functions, or operations of method 200 may be performed by a computing device or system 400, and/or a processing system 402 as described in connection with FIG. 4 below. For instance, the computing device 400 may represent any one or more components of an application server that is configured to perform the steps, functions and/or operations of the method 200. For illustrative purposes, the method 200 is described in greater detail below in connection with an example performed by a processing system, such as processing system 402.

The method 200 begins in step 202 and proceeds to step 204. In step 204, the processing system may define a study group, where the study group includes at least a first network element and a second network element of the cellular network (and wherein the cellular network may include a plurality of network elements including and in addition to the first network element and the second network element). In one example, network elements (e.g., base stations, radio network controllers, transport network elements, core switches, routers, servers, and the like) within the study group are network elements that are expected to be within an impact scope of a change that is to be deployed in the cellular network. Within the context of the present disclosure, the "impact scope" of a change is understood to refer to a group of network elements whose performance is expected to be affected by the change. For instance, the impact scope may include any network elements at which the change is to be directly deployed or implemented (e.g., a network element whose configuration parameters are changed) and/or any upstream or downstream network elements whose performance may be affected as a result (e.g., if a change at a first network element causes the first network element's throughput to increase, then the performance of a second network element located downstream of the first network element may be affected as the second network element adjusts to process the increased throughput). For instance, the study group may be defined in one example as the network elements at which the change is directly deployed, plus any network elements within x hops of the network elements at which the change is directly deployed.

In one example, the processing system may have access to or may construct a topological graph of the cellular network, where the topological graph helps the processing system to define the study group. For instance, the topological graph may comprise a plurality of nodes, where each node may represent one of the network elements in the cellular network. Links between nodes may represent the connectivity of the network elements represented by the nodes. For instance, an X2 link between nodes that represent LTE base stations may be used to calculate one-hop neighbors of the base stations.

The topological graph may also help to model the impacts of changes deployed in the cellular network, as discussed in further detail below. For instance, the impact of a given change may be local, or may instead propagate across the cellular network. As an example, certain base station changes may impact only voice and data sessions established via the base station at which the change is deployed, whereas other base station changes (e.g., changes related to antenna tilt optimization, transmission power updates, or the like) may also impact sessions established via neighboring base stations.

In one example, the topological graph may be constructed using data acquired from one or more EMSs in the cellular network, where each EMS may cover multiple network elements over a region of the cellular network. The EMSs may provide topological information, as well as performance measurements, configuration logs, call detail records, network alarms, and other data that may assist in assessing the impact of a change to the cellular network. In one example, end-to-end service paths may be derived from the sectors in the RAN entities to the entities in the core of the cellular network.

In step 206, the processing system may define a control group, where the control group includes at least a third network element of the cellular network. In one example, network elements within the control group comprise network elements that are not expected to be within the impact scope of the change that is to be deployed in the cellular network. In one example, the processing system may define the control group members automatically, based on the impact scope that is defined for the study group. For instance, the control group may include network elements at which the change was not directly deployed (e.g., network element whose configuration parameters were not changed, to continue the above example) and/or network elements that are at least x+1 hops away from the network elements at which the change is directly deployed.

Alternatively or in addition, the processing system may simply automatically exclude any network elements that are already defined as part of the study group from the control group. For instance, if network elements a and b are included in the study group in step 204, then network elements a and b may not be considered for membership in the control group in step 206. Thus, in one example, there may be no overlap between the study group and the control group (e.g., the same network element cannot be a member of both the study group and the control group).

In one example, the size of the control group may be larger than the size of the study group. For instance, if the study group comprises a plurality of LTE base stations, and each LTE base station may have up to thirty X2 neighbors, the size of the control group may be thirty times as large as the size of the study group. However, the larger the control group, the longer the impact assessment of the method 200 may take. In order to speed the impact assessment, in one example, a smaller control group (e.g., two to three times the size of the study group) may be defined, and the members of the control group may be randomly selected from among all eligible network elements (e.g., all network elements that are not already part of the study group).

By defining separate study and control groups, the impacts of external factors that may influence the quality of cellular service (e.g., weather changes, foliage changes, traffic pattern changes, user mobility, network events, and/or other factors that are not tied directly to the deployed change) can be minimized later in the impact assessment. This makes it easier to determine when observed changes in network performance are truly a result of changes that have been deployed in the network, rather than simply side effects of external factors.

In step 208, the processing system may identify a time at which a change is deployed at the first network element. The change may comprise, for example, installation of a new software release, a service feature introduction, a configuration change, an equipment re-home, a firmware upgrade, a hardware upgrade, a topology modification, and/or another change. In one example, the processing system may be explicitly informed of the time of the change (e.g., by a human operator who has knowledge of the change). For instance, an operations and engineering team of the telecommunication service provider may use a scheduling tool to create and track staggered scheduled changes across the study group. The scheduling tool may allow the team to provide information about each change, such the planned start and end times for deployment, information about affected network elements, change identifiers, a change summary, a change type (e.g., software upgrade versus parameter change), Method of Procedure (MOP) documents that capture the change workflow, the names of the individuals or teams requesting and/or executing the change, business risks associated with change, whether the change is likely to transiently disrupt service, and/or whether the change was successfully deployed.

In another example, the processing system may automatically detect when the change has been deployed at the first network element (e.g., by monitoring the first network element for changes). For instance, in one example, the processing system may identify the change by tracking network element configurations to detect changes. A detected difference in software version information may indicate that a software upgrade is being deployed. A detected difference in upstream or downstream nodes may indicate that an equipment rehome has been performed.

In step 210, the processing system may identify a time at which the change is deployed at the second network element. As discussed above, a change may be deployed across the cellular network in a staggered manner, meaning that the change is deployed at different network elements (of the study group) at different times. For instance, the change may be deployed at the first network element at a first time and then deployed at the second network element at a second time that is subsequent to the first time.

In step 212, the processing system may time-align the change at the first network element and the change at the second network element to a common (e.g., single or same) time. In one example, the time alignment normalizes the change at all network elements that are members of the study group to account for the staggered manner in which the change is deployed. More specifically, time alignment of the changes at the network elements may be achieved by normalizing the change times for each network element in the study group as time zero.

Next, as discussed in connection with steps 214-220, pre-interval time-series and post-interval time-series may be constructed through a comparison to the common time to which the changes have been normalized. For instance, in step 214, the processing system may compute a first time-series based on a first set of values for key performance indicators (KPIs) of the study group, where the first set of values is measured prior to the common time. In step 216, the processing system may compute a second time-series based on a second set of values for the key performance indicators of the study group, where the second set of values is measured subsequent to the common time. In step 218, the processing system may compute a third time-series based on a third set of values for key performance indicators of the control group, where the third set of values is measured prior to the common time. In step 220, the processing system may compute a fourth time-series based on a fourth set of values for the key performance indicators of the control group, where the fourth set of values is measured subsequent to the common time.

Figure 3:
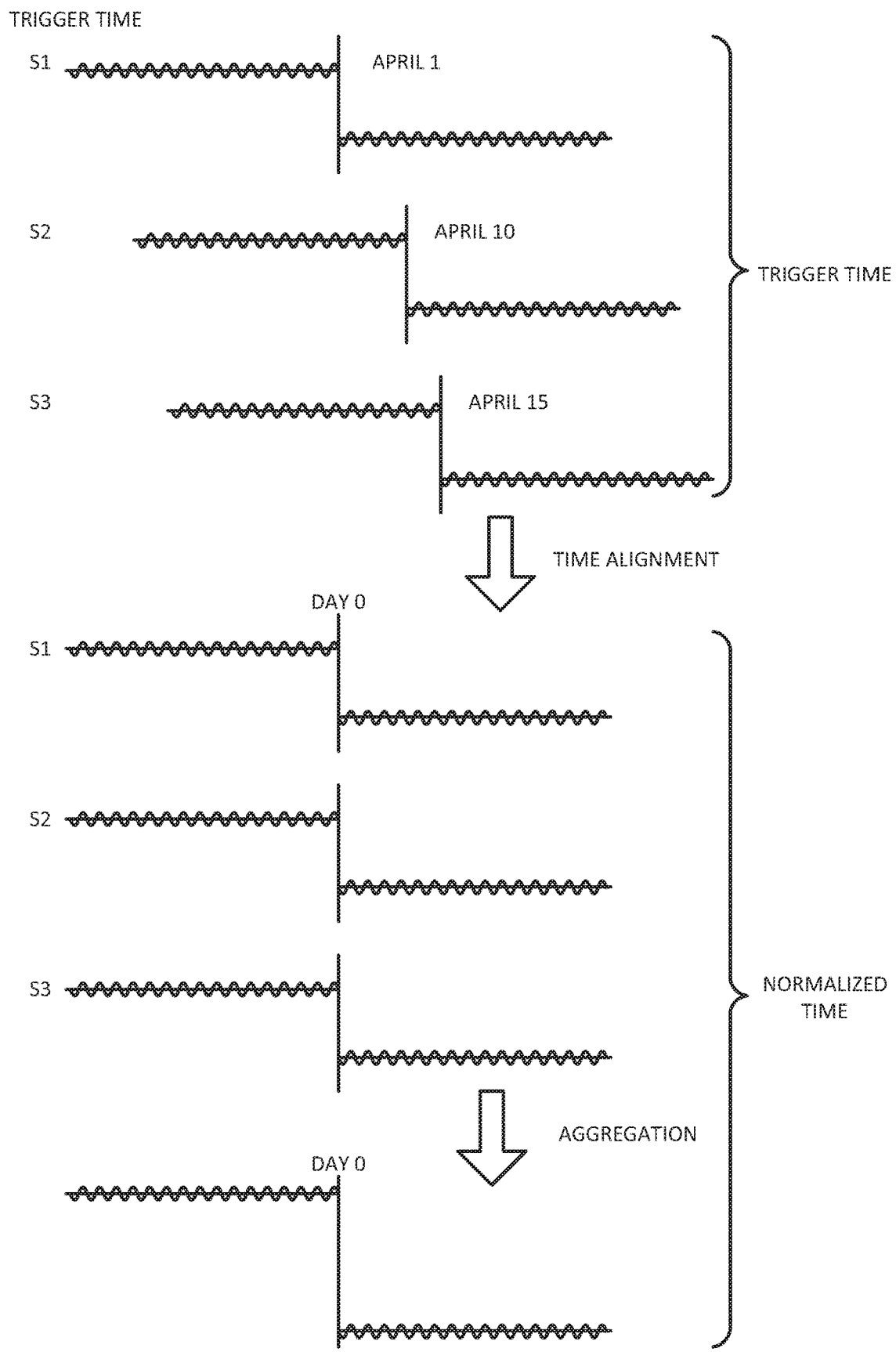
FIG. 3 illustrates an example time alignment, normalization, and aggregation (time-series construction) for a staggered change deployment.

FIG. 3, for instance, illustrates an example time alignment, normalization, and aggregation (time-series construction) for a staggered change deployment. In other words, FIG. 3 illustrates how steps 206-220 may be carried out for an example study group. In the example of FIG. 3, for a base station that was upgraded on April $1^{st}$, April $2^{nd}$ would be Day 1 of the upgrade (assuming a daily time aggregation). A hash table for mapping the base station and change time to either the study group or the control group and to a plurality of attribute values may be used to perform the spatio-temporal normalization and aggregation for each KPI, as discussed in further detail below.

In one example, the attributes associated with the attribute values are used to normalize and aggregate the KPIs. In one example, the attributes may include, for instance, configuration parameters of the network elements in the study group and the control group, traffic loads on the network elements or links in the study group and the control group, mobility patterns within the cellular network, location characteristics within the cellular network (e.g., commercial versus residential locations, urban versus rural locations, etc.), or population densities within the cellular network.

In one example, the processing system may aggregate the set of attributes for a corresponding network element and change time (e.g., the time at which the change is deployed at the corresponding network element). For each network element and change time, the processing system knows whether the network element is a member of the study group or a member of the control group. The processing system also knows the values of the attributes for that network element (e.g., via reporting by the network element, probes, or other means). In one example, aggregating the set of attributes may involve creating a hash table, as discussed above, to map the values of the attributes to the network element and change time.

Since the number of attributes can be large (e.g., on the order of tens of thousands in some cases), the processing system may automatically identify the impact of a deployed change across multiple aggregation levels in order to identify the attributes that are most relevant to the deployed change. For instance, a multi-way combination across m attributes can be as high as $2^m$. However, the impact of a change on network performance is often localized to either a single attribute among m or to a pairwise combination among $m^2$. However, as the search space is still relatively large, automatic identification of the impact can significantly speed the assessment process.

In one example, the KPIs from which the first, second, third, and fourth time-series are computed may be selected from among a plurality of potential KPIs. In one example, equations that balanced the selected KPIs may be defined on relatively low granularities (e.g., sectors on a base station), which may support aggregation across different attributes (e.g., carrier frequencies for sectors, hardware versions of the base stations, etc.).

In one example, complex functionalities, such as the optimization of the cellular network using self-organizing networks (SON), may include several parameter changes that focus on improving a few specific KPIs. For instance, antenna tilt, transmission power, and handover parameters are all examples of such parameter changes. Domain knowledge may help the assessment to focus on those few specific KPIs, thereby significantly reducing false positives and the amount of time spent analyzing network performance impacts that are unrelated to the function or intent of the change. As an example, the volume of network traffic in the telecommunication service provider network may increase due to a SON parameter change, and the increase in network traffic may, in turn, result in a performance degradation (e.g., decreased data throughput).

In one example, a KPI time-series is constructed for every network element in the study group and every network element in the control group. In further examples, certain time windows (e.g., specific times of day, such as daytime versus nighttime, or specific days of the week, such as holidays or weekends) may be excluded from the time-series construction of steps 214-220. The time windows to be excluded may be user defined.

For instance, referring again to FIG. 3, if the study group included network elements a and b on hardware versions X and Y, respectively, and the control group included network elements c and d on hardware versions X and Y, respectively, then normalization and aggregation (according to steps 206-220) would result in KPI aggregates for each of hardware versions X and Y. Study group a on hardware version X could then be compared to control group c on hardware version X; similarly, study group b on hardware version Y could be compared to control group d on hardware version Y. For each KPI ($K_1, K_2, \ldots, K_n$) and network element configuration ($E_1, E_2, \ldots, E_m$), there is a study group aggregate KPI and a control group aggregate KPI at the specific, configuration-level aggregation.

In one example, the total number of times-series constructed in steps 214-220 is $2*n*m$, where n represents the number of KPIs, and m represents the number of configurations (e.g., combinations of attributes) of the network elements.

In step 222, the processing system may detect an impact of the change on a performance of the cellular network, by comparing the first time-series, the second time-series, the third time-series, and the fourth time-series. In one example, the impact is detected by conducting a statistical analysis that compares the network performance before the change to the network performance after the change (e.g., before and after the common time to which the changes at the first and second network elements were normalized).

In one example, the processing system may learn a dependency model between the study group and the control group using the first and third (i.e., pre-change) time series. The dependency model may then be used to forecast the post-change time-series for the control group (e.g., the fourth time-series), for instance by using post-change KPIs for the control group. The same dependency model may also be used to compute forecast KPI values for the study group prior to the change (e.g., using pre-change KPIs for the control group). A forecast difference time-series may be constructed by subtracting the forecast value for the study group from the observed (e.g., actual) time-series for the study group, for both the pre-change interval and the post-change interval. Robust rank-order tests may be used to statistically compare the post-change interval forecast difference with the pre-change interval forecast difference.

In one example, the learning process may be made more robust by using uniform sampling on the control group and comparing the forecast difference results before and after the change for each sampling iteration. Multiple iterations of forecast difference comparisons may increase the confidence that a small number of network performance changes in the control group will not significantly influence the outcome of the study and control group analyses. Uniform sampling may also help to reduce the impact of poor predictors.

In step 224, the processing system may initiate a remedial action when the impact detected in step 222 comprises a degradation to the network performance. A remedial action may take any one or more of a variety of forms. For instance, the remedial action may comprise halting the deployment of the change. As an example, if the change comprises a configuration change to a plurality of base stations, the remedial action may comprise preventing the configuration change from being implemented at any additional base stations (e.g., by modifying a rollout schedule for the configuration change, by sending signals to a controller to not transmit the configuration change to the additional base stations, by sending a signal to the additional base stations instructing the additional base stations to not implement the configuration change, etc.).

In some examples, remedial action may halt the change for some, but not all, segments of the cellular network. For instance, continuing the above example, if the configuration change results in a degradation in network performance in the Washington, D.C. area, but network performance has improved or remained steady in other geographic areas after the configuration change, then the configuration change may be halted within some radius of Washington, D.C. (but may be allowed to proceed in all other geographic regions outside of that radius).

In another example, the remedial action may comprise rolling back or undoing the change. For instance, continuing the above example, the base stations at which the configuration change has already been deployed may be reset to their pre-change configurations (e.g., by modifying a rollout schedule for the configuration change to add the reset, by sending signals to a controller to transmit the pre-change configuration as part of a reset, by sending a signal to the base stations instructing the base stations to reset to the pre-change configuration, etc.).

The method 200 may end in step 226.

Although not expressly specified above, one or more steps of the method 200 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 that recite a determining operation or involve a decision do not necessarily require that both branches of the determining operation be practiced. In other words, one of the branches of the determining operation can be deemed as an optional step. In addition, one or more steps, blocks, functions, or operations of the above described method 200 may comprise optional steps, or can be combined, separated, and/or performed in a different order from that described above, without departing from the example embodiments of the present disclosure. The method 200 may also be expanded to include additional steps. Thus, these and other modifications are all contemplated within the scope of the present disclosure.

In some examples, the assessment criteria may be customized based on the type of changes, the time scale, and/or the scope of the change (e.g., first field application versus network-wide rollout). A single criteria that provides an optimal assessment across all types of changes, time scales, and change scopes may not exist. For instance, in one example, the control group may be customized based on change type. As an example, a change to an antenna tilt of a base station may impact one-hop X2 neighbors and may, in some cases, also impact neighbors that are three to four hops away (e.g., neighbors that are three to four hops away may experience less noise and higher SINR). By contrast, a software upgrade to a base station is not likely to impact network elements beyond the base station at which the software upgrade is deployed. The control group may also be customized to account for the unintentional propagation of impacts (e.g., repairing a UMTS base station may impact LTE service performance due to human error).

Moreover, while real-time impact assessments may help to discover severe degradations to network performance as quickly as possible, long-term assessments may also help to discover more subtle impacts. Thus, time thresholds for performing assessments may be selected to balance the benefits of both real-time and long-term assessment.

In some examples, a greater number of KPIs may be analyzed during FFA testing than during network-wide rollout. This may help to quickly detect changes that may result in problematic impacts, before those impacts have the opportunity to spread to a larger scale (which, in turn, may lessen the number of pauses and other problems that may occur during network-wide rollout). In one example, the KPIs analyzed during network-wide rollout may include top service level KPIs such as accessibility, retainability, and data throughput. KPIs may be ranked based on operational experiences across several software upgrades and configuration changes in the telecommunication service provider network. In one example, a KPI's rank may be determined based on the number of times that the KPI is impacted by a change. The rank may fall within a predefined range (e.g., from one to three, where one indicates that the KPI is frequently impacted by changes and three indicates that the KPI is rarely impacted by changes). Table 2 (below), for example, illustrates example ranks for various KPIs, where the ranks are determined using operational experiences across multiple software upgrades and configuration changes.

TABLE 2

Example KPI Ranks Across Multiple Changes

| Rank 1 KPIs | Rank 2 KPIs | Rank 3 KPIs |
| --- | --- | --- |
| Voice accessibility | Data accessibility | Physical resource block utilization |
| Voice retainability | Data retainability | |
| Data throughput | Handovers | Channel quality |
| | Traffic volume | Block error rate |
| | | HARQ DL 16/64 QAM/QPSK |

In one example, FFA assessments being with rank 1 KPIs and incorporate lower rank KPIs when troubleshooting unexpected performance degradations.

Sometimes, even when FFA testing is very stringent, unexpected or contrasting impacts may still be observed during network-wide rollout due to the underlying network complexity, scale, and/or diversity. For instance, an improvement in data throughput may be observed during FFA testing of a proposed change. However, when the proposed change is deployed during a network-wide rollout, the data throughput may be observed to worsen in some locations. When such a contrasting network performance impact is detected, troubleshooting of the impact may seek to determine whether the impact is a result of the proposed change or the result of some unrelated factor. Troubleshooting may take several hours, or even days, of manual effort; however, a decision as to whether to halt (or partially halt, or roll back) the network-wide rollout may need to be made much sooner. The normalization and aggregation across multiple combinations of network element attributes, as described above, may enable more rapid troubleshooting.

In one example, attributes for aggregation may be ranked in a manner similar to the KPIs, as discussed above. For instance, ranks for attributes may fall in a predefined range (e.g., from one to four, where one indicates discovery of an attribute across multiple impacts and four indicates an attribute that induces an impact in rare instances) and may be based on operational experiences. For instance, configuration changes that capture new functionalities with a rank of one may be observed to cause unexpected network performance impacts with new software releases in multiple instances. Table 3 (below), for example, illustrates example ranks for various attributes, where the ranks are determined using operational experiences across multiple software upgrades and configuration changes.

TABLE 3

Example Attribute for Aggregation Ranks Across Multiple Changes

| Attributes for aggregation | Rank |
| --- | --- |
| Configuration changes capturing new functionalities | 1 |
| Optimization changes | 1 |
| Carrier frequency | 1 |
| Smart phone type specific | 1 |
| High usage base stations (e.g., serving stadiums) | 1 |
| Carrier frequency and market | 1 |
| Market (multi-attribute combination) | 2 |
| User mobility | 2 |
| Neighbor software version | 2 |
| Border versus non-border location | 3 |
| Morphology (urban, suburban, rural) | 3 |
| Hardware version | 3 |
| Vendor migration | 3 |
| NodeB face | 4 |
| Channel bandwidth - 5 MHz versus 10 MHz | 4 |

Figure 4:
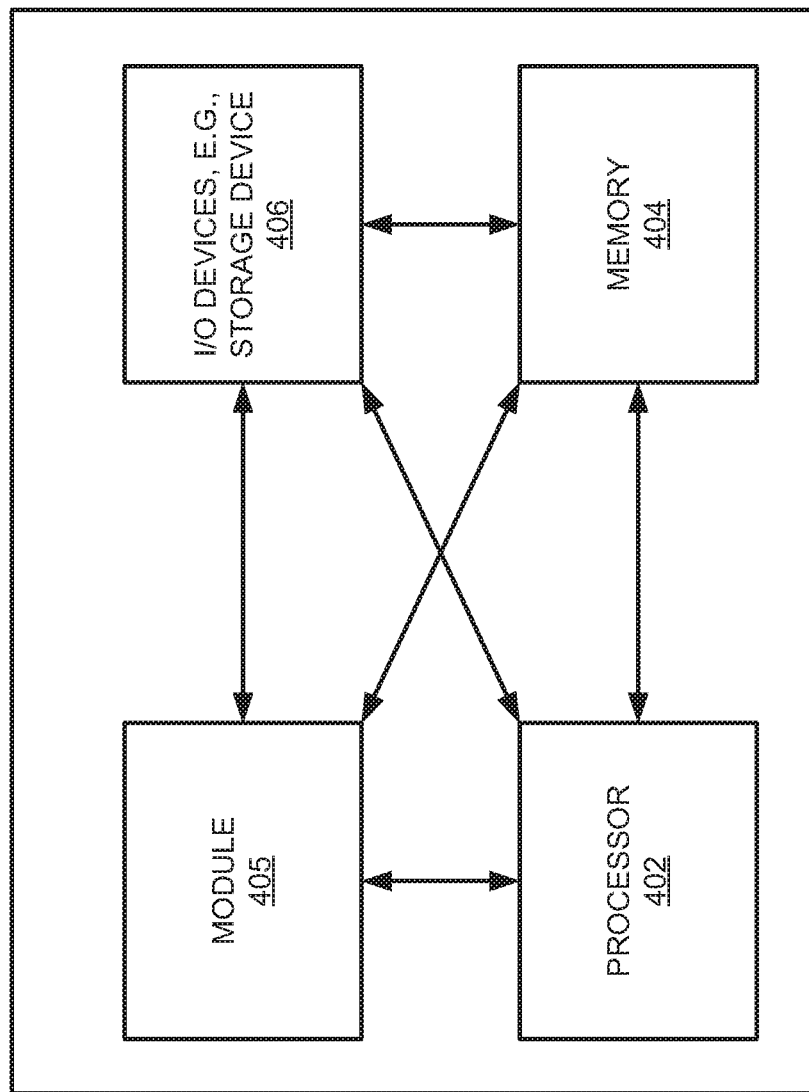
FIG. 4 illustrates a high level block diagram of a computing device or system specifically programmed to perform the steps, functions, blocks and/or operations described herein.

FIG. 4 depicts a high-level block diagram of a computing device or processing system specifically programmed to perform the functions described herein. For example, any one or more components or devices illustrated in FIG. 1 or described in connection with the method 200 may be implemented as the system 400. As depicted in FIG. 4, the processing system 400 comprises one or more hardware processor elements 402 (e.g., a central processing unit (CPU), a microprocessor, or a multi-core processor), a memory 404 (e.g., random access memory (RAM) and/or read only memory (ROM)), a module 405 for present disclosure describes a device, computer-readable medium, and method for assessing the impacts of changes to a cellular network architecture, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). In accordance with the present disclosure input/output devices 406 may also include antenna elements, transceivers, power units, and so forth. Although only one processor element is shown, it should be noted that the computing device may employ a plurality of processor elements. Furthermore, although only one computing device is shown in the figure, if the method 200 as discussed above is implemented in a distributed or parallel manner for a particular illustrative example, i.e., the steps of the above method 200, or the entire method 200 is implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 402 can also be configured or programmed to cause other devices to perform one or more operations as discussed above. In other words, the hardware processor 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 200. In one example, instructions and data for the present module or process 405 for present disclosure describes a device, computer-readable medium, and method for assessing the impacts of changes to a cellular network architecture (e.g., a software program comprising computer-executable instructions) can be loaded into memory 404 and executed by hardware processor element 402 to implement the steps, functions, or operations as discussed above in connection with the illustrative method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 405 for present disclosure describes a device, computer-readable medium, and method for assessing the impacts of changes to a cellular network architecture (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method comprising:
    selecting, by a processing system in a telecommunication service provider network, a study group, wherein the study group comprises at least a first network element and a second network element of the telecommunication service provider network;
    selecting, by the processing system, a control group, wherein the control group comprises a third network element of the telecommunication service provider network;
    identifying, by the processing system, a time at which a change is deployed at the first network element;
    identifying, by the processing system, a time at which the change is deployed at the second network element, wherein the time at which the change is deployed at the second network element is subsequent to the time at which the change is deployed at the first network element;
    time-aligning, by the processing system, the change at the first network element and the change at the second network element to a common time;
    computing, by the processing system, a first time-series based on a first set of values for key performance indicators of the study group, wherein the first set of values is measured prior to the common time;
    computing, by the processing system, a second time-series based on a second set of values for the key performance indicators of the study group, wherein the second set of values is measured subsequent to the common time;
    computing, by the processing system, a third time-series based on a third set of values for key performance indicators of the control group, wherein the third set of values is measured prior to the common time;
    computing, by the processing system, a fourth time-series based on a fourth set of values for the key performance indicators of the control group, wherein the fourth set of values is measured subsequent to the common time;
    detecting, by the processing system, an impact of the change on a performance of the telecommunication service provider network by comparing the first time-series, the second time-series, the third-time series, and the fourth time-series; and
    initiating, by the processing system, a remedial action when the impact comprises a degradation to the performance.

2. The method of claim 1, wherein the computing the first time-series, the computing the second time-series, the computing the third time-series, and the computing the fourth time-series comprise:
    aggregating, by the processing system, the first set of values, the second set of values, the third set of values, and the fourth set of values, respectively.

3. The method of claim 1, wherein the study group comprises a first plurality of network elements of the telecommunication service provider network at which the change is directly deployed, and wherein the first plurality of network elements includes the first network element and the second network element.

4. The method of claim 3, wherein the change comprises a new software release that is installed at the first plurality of network elements.

5. The method of claim 3, wherein the change comprises a new service feature for the telecommunication service provider network.

6. The method of claim 3, wherein the change comprises a change to a configuration parameter of the first plurality of network elements.

7. The method of claim 3, wherein the change comprises a re-home of the first plurality of network elements.

8. The method of claim 3, wherein the change comprises an upgrade to at least one of hardware of the first plurality of network elements and firmware of the first plurality of network elements.

9. The method of claim 3, wherein the change comprises a security patch to the first plurality of network elements.

10. The method of claim 3, wherein the change comprises vendor migration of the first plurality of network elements.

11. The method of claim 3, wherein the change comprises a modification to a topology of the first plurality of network elements.

12. The method of claim 3, wherein the control group comprises a second plurality of network elements of the telecommunication service provider network at which the change is not directly deployed, and wherein the second plurality of network elements includes the third network element.

13. The method of claim 1, wherein the first time-series, the second time-series, the third time-series, and the fourth time-series are computed across a plurality of attribute combinations for the study group and the control group.

14. The method of claim 1, wherein the detecting comprises performing a statistical analysis that compares the performance of the telecommunication service provider network before the common time to the performance of the telecommunication service provider network after the common time.

15. The method of claim 1, wherein the performance of the telecommunication service provider network is defined as a measure of accessibility.

16. The method of claim 1, wherein the performance of the telecommunication service provider network is defined as a measure of retainability.

17. The method of claim 1, wherein the performance of the telecommunication service provider network is defined as a measure of throughput.

18. The method of claim 1, wherein the performance of the telecommunication service provider network is defined as a measure of handover success rates.

19. A device comprising:
a processing system of a telecommunication service provider network; and
a computer-readable medium storing instructions which, when executed by the processing system, cause the processing system to perform operations, the operations comprising:
selecting a study group, wherein the study group comprises at least a first network element and a second network element of the telecommunication service provider network;
selecting a control group, wherein the control group comprises a third network element of the telecommunication service provider network;
identifying a time at which a change is deployed at the first network element;
identifying a time at which the change is deployed at the second network element, wherein the time at which the change is deployed at the second network element is subsequent to the time at which the change is deployed at the first network element;
time-aligning the change at the first network element and the change at the second network element to a common time;
computing a first time-series based on a first set of values for key performance indicators of the study group, wherein the first set of values is measured prior to the common time;
computing a second time-series based on a second set of values for the key performance indicators of the study group, wherein the second set of values is measured subsequent to the common time;
computing a third time-series based on a third set of values for key performance indicators of the control group, wherein the third set of values is measured prior to the common time;
computing a fourth time-series based on a fourth set of values for the key performance indicators of the control group, wherein the fourth set of values is measured subsequent to the common time;
detecting an impact of the change on a performance of the telecommunication service provider network by comparing the first time-series, the second time-series, the third-time series, and the fourth time-series; and
initiating a remedial action when the impact comprises a degradation to the performance.

20. A non-transitory computer-readable medium storing instructions which, when executed by a processing system of a telecommunication service provider network, cause the processing system to perform operations, the operations comprising:
selecting a study group, wherein the study group comprises at least a first network element and a second network element of the telecommunication service provider network;
selecting a control group, wherein the control group comprises a third network element of the telecommunication service provider network;
identifying a time at which a change is deployed at the first network element;
identifying a time at which the change is deployed at the second network element, wherein the time at which the change is deployed at the second network element is subsequent to the time at which the change is deployed at the first network element;
time-aligning the change at the first network element and the change at the second network element to a common time;
computing a first time-series based on a first set of values for key performance indicators of the study group, wherein the first set of values is measured prior to the common time;
computing a second time-series based on a second set of values for the key performance indicators of the study group, wherein the second set of values is measured subsequent to the common time;
computing a third time-series based on a third set of values for key performance indicators of the control group, wherein the third set of values is measured prior to the common time;
computing a fourth time-series based on a fourth set of values for the key performance indicators of the control group, wherein the fourth set of values is measured subsequent to the common time;
detecting an impact of the change on a performance of the telecommunication service provider network by comparing the first time-series, the second time-series, the third-time series, and the fourth time-series; and
initiating a remedial action when the impact comprises a degradation to the performance.

* * * * *